United States Patent
Ikeno et al.

(10) Patent No.: US 9,126,636 B2
(45) Date of Patent: Sep. 8, 2015

(54) TIBIA PAD AND TIBIA PAD INSTALLATION STRUCTURE

(75) Inventors: Eisuke Ikeno, Toyota (JP); Kunio Ohashi, Toyota (JP); Satoshi Yamaguchi, Toyota (JP); Yusuke Fukushima, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/125,740

(22) PCT Filed: Jun. 23, 2011

(86) PCT No.: PCT/JP2011/064480
§ 371 (c)(1),
(2), (4) Date: Dec. 12, 2013

(87) PCT Pub. No.: WO2012/176321
PCT Pub. Date: Dec. 27, 2012

(65) Prior Publication Data
US 2014/0117715 A1    May 1, 2014

(51) Int. Cl.
*B60R 21/04* (2006.01)
*B62D 21/15* (2006.01)
*B60R 21/00* (2006.01)

(52) U.S. Cl.
CPC ............. *B62D 21/15* (2013.01); *B60R 21/04* (2013.01); *B60R 2021/0046* (2013.01)

(58) Field of Classification Search
CPC . B62D 21/15; B60R 21/04; B60R 2021/0046
USPC ............. 296/187.05, 75; 280/751; 180/90.6
See application file for complete search history.

(56) References Cited

U.S. PATENT DOCUMENTS

| 8,857,895 | B2 * | 10/2014 | Millar ..................... 296/187.05 |
| 2003/0222478 | A1 | 12/2003 | Akasaka et al. |
| 2009/0174175 | A1 | 7/2009 | Takakura et al. |

FOREIGN PATENT DOCUMENTS

| JP | A-09-086255 | 3/1997 |
| JP | A-10-297343 | 11/1998 |
| JP | A-10-297345 | 11/1998 |
| JP | A-2000-095150 | 4/2000 |
| JP | A-2002-331895 | 11/2002 |
| JP | A-2003-312540 | 11/2003 |
| JP | A-2004-306791 | 11/2004 |
| JP | A-2005-280560 | 10/2005 |
| JP | A-2006-205798 | 8/2006 |
| JP | A-2007-083902 | 4/2007 |

(Continued)

*Primary Examiner* — Stephen Gordon
(74) *Attorney, Agent, or Firm* — Oliff PLC

(57) ABSTRACT

A tibia pad has: a right foot placement portion having a right side horizontal portion formed horizontally and on which a passenger's right heel is placed, and a right side inclined portion formed at a vehicle front side of this right side horizontal portion and inclined with respect to a vehicle longitudinal direction to head toward a vehicle upper side while heading toward a vehicle front side; a pair of groove portions formed, at least in a bottom surface of the right side horizontal portion at the right foot placement portion, to extend along the vehicle longitudinal direction and to lined-up in a vehicle transverse direction; and a step portion formed at a transition portion between the right side horizontal and the right side inclined portions, and positioned between a rear and a front side ribs are formed at the right side horizontal and the right side inclined portions, respectively.

9 Claims, 10 Drawing Sheets

(56) References Cited

FOREIGN PATENT DOCUMENTS

| JP | A-2007-098978 | 4/2007 |
| JP | A-2007-290603 | 11/2007 |
| JP | A-2008-100685 | 5/2008 |
| JP | A-2008-110758 | 5/2008 |

* cited by examiner

TIBIA PAD AND TIBIA PAD INSTALLATION STRUCTURE

TECHNICAL FIELD

The present invention relates to a tibia pad and a tibia pad installation structure.

BACKGROUND ART

There are conventionally known lower leg portion impact absorbing pads for a vehicle that have a horizontal portion and an inclined portion and in which concave grooves that are elongated longitudinally are formed in the horizontal portion and the inclined portion, respectively (see, for example, Japanese Patent Application Laid-Open No. 2004-306791).

LIST OF PRIOR ART DOCUMENTS

Patent Document 1 Japanese Patent Application Laid-Open No. 2004-306791
Patent Document 2 Japanese Patent Application Laid-Open No. 2003-312540
Patent Document 3 Japanese Patent Application Laid-Open No. 2000-95150
Patent Document 4 Japanese Patent Application Laid-Open No. 2006-205798
Patent Document 5 Japanese Patent Application Laid-Open No. 2002-331895
Patent Document 6 Japanese Patent Application Laid-Open No. 2004-306791

SUMMARY OF INVENTION

Technical Subject

However, in these kinds of techniques, it is desirable to further reduce the peak value of the tibia index of impact.

The present invention has been made in consideration of the aforementioned problem, and an object thereof is to provide a tibia pad and a tibia pad installation structure that can further reduce the peak value of the tibia index.

Solution Addressing to Subject

In order to solve the aforementioned subject, a tibia pad relating to a first aspect of the present invention comprises: a foot placement portion having a horizontal portion that is formed horizontally and on which a heel of a foot of a passenger is placed, and an inclined portion that is formed at a vehicle front side of the horizontal portion and is inclined with respect to a vehicle longitudinal direction so as to head toward a vehicle upper side while heading toward a vehicle front side; a pair of groove portions that are formed, at least in a bottom surface of the horizontal portion at the foot placement portion, so to as to extend along the vehicle longitudinal direction and so as to be lined-up in a vehicle transverse direction; and a weak portion that is formed at the inclined portion or at a transition portion between the horizontal portion and the inclined portion, and that is a starting point of bending of the foot placement portion around a vehicle transverse direction axis at the foot placement portion.

In accordance with this tibia pad, the horizontal portion of the foot placement portion is made to be the portion on which the heel of the passenger is placed. The pair of groove portions, that extend along the vehicle longitudinal direction and are lined-up in the vehicle transverse direction, are formed in at least the bottom surface of the horizontal portion at the foot placement portion. Accordingly, in a case in which load is applied to the horizontal portion of the foot placement portion by the heel of the passenger accompanying a front collision of the vehicle, impact can be absorbed due to the horizontal portion of the foot placement portion compressively deforming.

Moreover, the weak portion, that is the starting point of the bending around a vehicle transverse direction axis at the foot placement portion, is formed at the inclined portion or at the transition portion between the horizontal portion and the inclined portion. Accordingly, in a case in which load is applied to the horizontal portion by the heel of the passenger accompanying a front collision of the vehicle, the foot placement portion bends around an axis in the vehicle transverse direction, with this weak portion being the starting point. Due thereto, sliding of the heel toward the vehicle front side can be suppressed, and therefore, from immediately after the collision, the load of the lower leg of the passenger can be applied to the horizontal portion that is the intended position of load application. As a result, for the leg of the passenger, the peak value of the tibia index can be reduced more.

A tibia pad relating to a second aspect of the present invention is structured such that the tibia pad of the first aspect further comprises: a rib that is formed by a region between the pair of groove portions, wherein the rib has a rear side rib that is formed at the horizontal portion, and a front side rib that is formed at the inclined portion and whose projecting height is smaller than a projecting height of the rear side rib, and the weak portion is made to be a step portion that is formed at the transition portion and is positioned between the rear side rib and the front side rib.

In accordance with this tibia pad, the region between the above-described pair of groove portions is formed as a rib. The projecting height of the front side rib, that is formed at the inclined portion, of this rib is made to be smaller than the projecting height of the rear side rib that is formed at the horizontal portion, and the front side rib has a step portion, that serves as a weak portion, between the front side rib and the rear side rib. Accordingly, in a case in which load is applied to the horizontal portion by the heel of the passenger accompanying a front collision of the vehicle, the foot placement portion can be bent around an axis in the vehicle transverse direction, with this step portion being the starting point.

A tibia pad relating to a third aspect of the present invention is structured such that, in the tibia pad of the first aspect, the weak portion is made to be a through-hole that passes-through in a thickness direction of the inclined portion, or a groove that opens at one of a top surface and a bottom surface of the inclined portion.

In accordance with this tibia pad, a through-hole that passes-through in the thickness direction of the inclined portion, or a groove that opens at one of the top surface and the bottom surface of the inclined portion, is formed in the inclined portion as the above-described weak portion. Accordingly, in a case in which load is applied to the horizontal portion by the heel of the passenger accompanying a front collision of the vehicle, the foot placement portion can be bent around an axis in the vehicle transverse direction, with this through-hole or groove being the starting point.

A tibia pad relating to a fourth aspect of the present invention is structured such that, in the tibia pad of the third aspect, the weak portion has a first weak portion, and a second weak portion that is formed at a position that is offset toward a vehicle transverse direction one side and a vehicle rear side with respect to the first weak portion.

In accordance with this tibia pad, the weak portion has a first weak portion, and a second weak portion that is formed at a position that is offset toward a vehicle transverse direction one side and a vehicle rear side with respect to the first weak portion.

Accordingly, in a case in which load is applied to the horizontal portion of the foot placement portion by the heel of the passenger accompanying a front collision of the vehicle, the foot placement portion tilts toward the side at which the second weak portion is provided, i.e., toward the vehicle transverse direction one side, and therefore, the ankle of the passenger can be rotated toward the vehicle transverse direction one side. Due thereto, the axial direction load that is generated at the lower leg of the passenger, the rotational moment in the left-right direction of the ankle, and the rotational moment in the front-rear direction of the heel can be distributed effectively. As a result, for the right leg of the passenger, the peak value of the tibia index can be reduced more effectively.

A tibia pad relating to a fifth aspect of the present invention is structured such that the tibia pad of the fourth aspect comprises: a rib that is formed by a region between the pair of groove portions, wherein the foot placement portion is a right foot placement portion on which is placed a right foot of a passenger who is seated in a driver's seat, and the rib is provided at a position that is offset, toward a vehicle transverse direction other side, with respect to a central line that passes-through a central portion in a vehicle transverse direction of an accelerator pedal.

In accordance with this tibia pad, the region between the above-described pair of groove portions is formed as a rib. This rib is provided at a position that is offset toward the side opposite the side at which the above-described second weak portion is provided, i.e., is provided at a position that is offset toward the vehicle transverse direction other side, with respect to the central line that passes-through the central portion in the vehicle transverse direction of the accelerator pedal.

Accordingly, in a case in which load is applied to the horizontal portion by the heel of the right foot of the passenger accompanying a front collision of the vehicle, the right foot placement portion can be tilted more toward the side opposite the side at which the above-described rib is provided, i.e., can be tilted more toward the vehicle transverse direction one side that is the side at which the second weak portion is provided. Due thereto, the ankle of the right leg of the passenger can be rotated more toward the vehicle transverse direction one side, and therefore, the axial direction load that is generated at the right lower leg of the passenger, the rotational moment in the left-right direction of the ankle, and the rotational moment in the front-rear direction of the heel can be distributed more effectively.

A tibia pad relating to a sixth aspect of the present invention is structured such that the tibia pad of any one of the first aspect through the fifth aspect comprises: a left foot placement portion on which a left foot of the passenger is placed and that is provided at a vehicle left side with respect to the right foot placement portion, that serves as the foot placement portion and on which is placed a right foot of a passenger who is seated in a driver's seat, wherein a reduced-thickness portion, that is made to be a through-hole that passes-through in a thickness direction of the left foot placement portion or a groove that opens at one of a top surface and a bottom surface of the left foot placement portion, is formed in the left foot placement portion.

In accordance with this tibia pad, the reduced-thickness portion, that is made to be a through-hole that passes-through in the thickness direction of the left foot placement portion or a groove that opens at one of the top surface and the bottom surface of the left foot placement portion, is formed in the left foot placement portion. Accordingly, in a case in which load is applied to the left foot placement portion by the left foot of the passenger accompanying a front collision of the vehicle, impact can be absorbed by this left foot placement portion compressively deforming. As a result, for the left leg of the passenger as well, the peak value of the tibia index can be reduced.

A tibia pad relating to a seventh aspect of the present invention is structured such that the tibia pad of the sixth aspect comprises: a connecting portion that connects the right foot placement portion and the left foot placement portion in the vehicle transverse direction, wherein a space portion, that is made to be a through-hole that passes-through in a thickness direction of the connecting portion or a groove that opens at one of a top surface and a bottom surface of the connecting portion, is formed in the connecting portion, and a sound absorbing material is provided at least at the space portion, among the pair of groove portions, the reduced-thickness portion and the space portion.

In accordance with this tibia pad, the space portion, that is made to be a through-hole that passes-through in the thickness direction of the connecting portion or a groove that opens at one of the top surface and the bottom surface of the connecting portion, is formed in the connecting portion. Further, the sound absorbing material is provided in at least the space portion, among the pair of groove portions that are formed in the above-described right foot placement portion, the reduced-thickness portion formed in the left foot placement portion and the space portion formed in the connecting portion. Accordingly, noise, such as road noise or engine sound or the like that penetrates into the vehicle cabin via the vehicle body panel or the tire house or the like, can be absorbed by this sound absorbing material.

A tibia pad relating to an eighth aspect of the present invention is structured such that the tibia pad of any one of the first aspect through the seventh aspect comprises: a left foot placement portion that is provided at a vehicle left side with respect to a right foot placement portion, that serves as the foot placement portion and on which is placed a right foot of a passenger who is seated in a driver's seat, and the left foot placement portion has a left side horizontal portion that is formed horizontally and on which a heel of a left foot of the passenger is placed, and a left side inclined portion that is formed at a vehicle front side of the left side horizontal portion and that is inclined with respect to the vehicle longitudinal direction so as to head toward the vehicle upper side while heading toward the vehicle front side, wherein a bending starting point portion, that is made to be a through-hole that passes-through in a thickness direction of a transition portion between the left side horizontal portion and the left side inclined portion, or is made to be a groove that opens at one of a top surface and a bottom surface of the transition portion, is formed in the transition portion.

In accordance with this tibia pad, the left foot placement portion has a left side horizontal portion and a left side inclined portion. A bending starting point portion, that is made to be a through-hole that passes-through in a thickness direction of a transition portion between the left side horizontal portion and the left side inclined portion, or is made to be a groove that opens at one of the top surface and the bottom surface of the transition portion, is formed in the transition portion. Accordingly, in a case in which load is applied to the left side horizontal portion by the left heel oft the passenger accompanying a front collision of the vehicle, the left foot placement portion bends around an axis in the vehicle transverse direction, with this bending starting point portion being the starting point. Due thereto, sliding of the heel toward the vehicle front side can be suppressed, and therefore, from immediately after the collision, the load of the left lower leg of the passenger can be applied to the left side horizontal portion that is the intended position of load application.

Further, in order to address the aforementioned subject, a tibia pad installation structure relating to a ninth aspect of the present invention comprises: the tibia pad of any one of the first aspect through the eighth aspect that has a right foot placement portion that serves as the foot placement portion and on which is placed a right foot of a passenger who is seated in a driver's seat; and a vehicle body panel on which the tibia pad is placed and at which a curved portion, that is formed convexly toward a vehicle lower side and that has a peak portion on a central line that passes-through a central portion in a vehicle transverse direction of an accelerator pedal, is formed at a region positioned beneath the horizontal portion.

In accordance with this tibia pad installation structure, a curved portion, that is formed convexly toward the vehicle lower side and that has a peak portion on a central line that passes-through the central portion in the vehicle transverse direction of the accelerator pedal, is formed at the vehicle body panel at a region that is positioned beneath the horizontal portion. Accordingly, the compressive deformation stroke of the horizontal portion can be ensured to be large on the central line that passes-through the central portion in the vehicle transverse direction of the accelerator pedal, and therefore, the impact absorbing performance at the horizontal portion can be improved more. Due thereto, for the right leg of the passenger, the peak value of the tibia index can be reduced more.

In a tibia pad installation structure relating to a tenth aspect of the present invention, the tibia pad installation structure of the ninth aspect comprises: a wall portion that is formed at the vehicle body panel, and is positioned at a vehicle right side with respect to the accelerator pedal, and is directed toward the vehicle upper side; and a rib that is formed by a region between the pair of groove portions, and is provided at a position that is offset toward the vehicle right side with respect to the central line.

In accordance with this tibia pad, the rib is provided at a position that is offset toward the vehicle right side with respect to the central line that passes through the central portion in the vehicle transverse direction of the accelerator pedal. Accordingly, in a case in which load is applied to the rear portion of the right foot placement portion by the right heel of the passenger accompanying a front collision of the vehicle, the ankle of the right foot of the passenger can be rotated toward the vehicle left side that is the side opposite the wall portion. Due thereto, interference between the right leg and the wall portion can be suppressed.

Advantageous Effects of Invention

As described in detail above, in accordance with the present invention, the peak value of the tibia index can be reduced more.

DESCRIPTION OF EMBODIMENTS

An embodiment of the present invention is described hereinafter with reference to the drawings.

Note that arrow UP, arrow FR and arrow RH that are shown in the respective drawings indicate the vehicle upper side, the vehicle front side and the vehicle right side, respectively.

Figure 1:
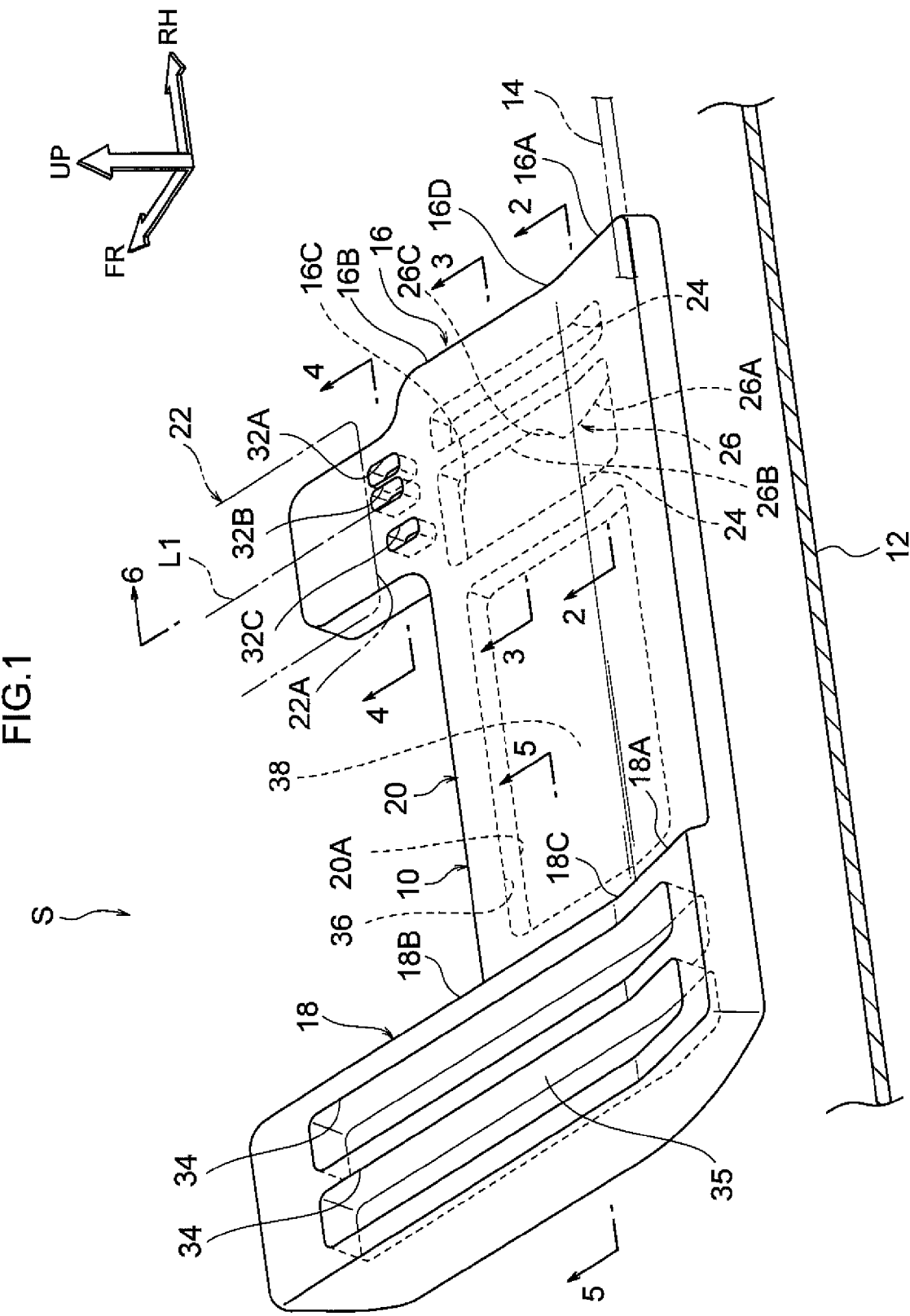
FIG. 1 is perspective view of a tibia pad installation structure relating to an embodiment of the present invention.

A tibia pad installation structure S, that relates to the embodiment of the present invention and is shown in FIG. 1, is applied to the feet portion of the driver's seat of a left-hand drive vehicle as an example. This tibia pad installation structure S has a tibia pad 10.

The tibia pad 10 is placed on a vehicle body panel 12 that is made to be the dash panel for example. An interior material 14, such as a carpet or a mat or the like for example, is laid on the vehicle body panel 12, and the tibia pad 10 is interposed between the vehicle body panel 12 and the interior material 14. This tibia pad 10 is formed of, for example, a foamed resin or the like that has an impact absorbing ability, and is structured to have a right foot placement portion 16 that is an example of a foot placement portion, a left foot placement portion 18 and a connecting portion 20.

The right foot placement portion 16 is provided at a position that overlaps, in the vehicle transverse direction, a hanging-type accelerator pedal 22 that is provided in the vehicle. A rear portion of the right foot placement portion 16 is made to be a right side horizontal portion 16A that is formed substantially horizontally. A front portion of the right foot placement portion 16, that is formed at the vehicle front side of this right side horizontal portion 16A, is made to be a right side inclined portion 16B that is inclined with respect to the vehicle longitudinal direction so as to head toward the vehicle upper side while heading toward the vehicle front side. The right side horizontal portion 16A and the right side inclined portion 16B are examples of the horizontal portion and the inclined portion in the present invention.

Figure 6:
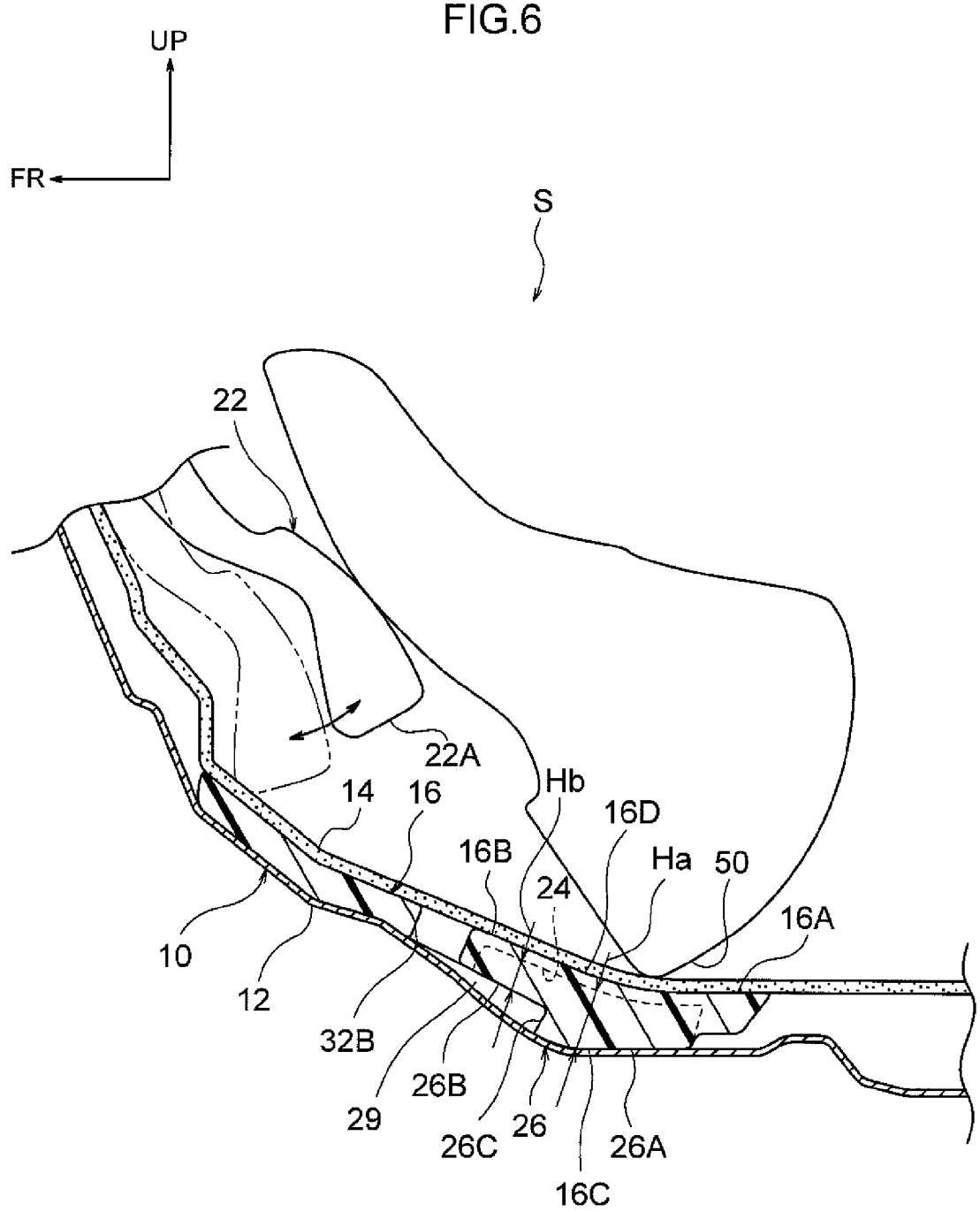
FIG. 6 is an enlarged sectional view of main portions along line 6-6 of FIG. 1.

Further, as shown in FIG. 6, the right side horizontal portion 16A is positioned beneath and at the rear of the accelerator pedal 22, such that a heel 50 of the right foot of the passenger, who is stepping-on the accelerator pedal 22 in a state of being seated in an unillustrated driver's seat, is placed thereon. On the other hand, the right side inclined portion 16B is positioned beneath the accelerator pedal 22.

Figure 2:
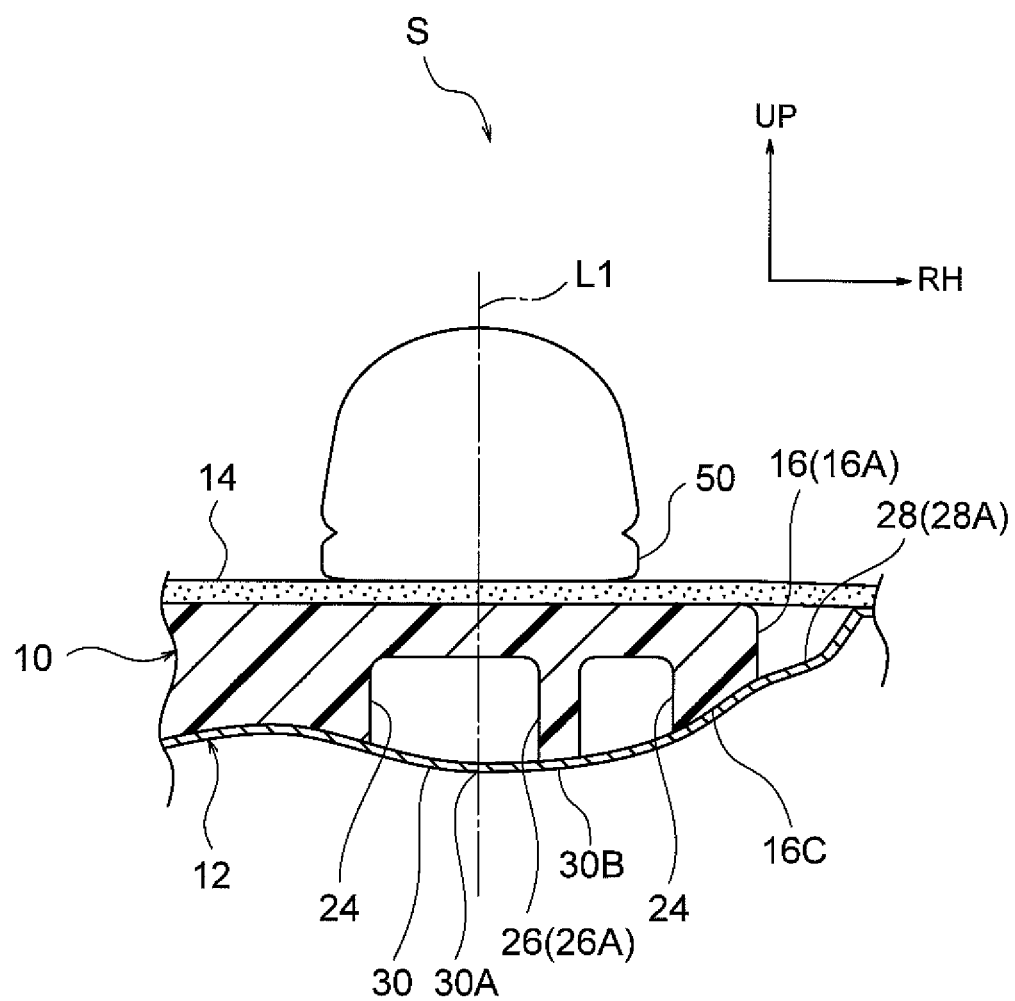
FIG. 2 is an enlarged sectional view of main portions along line 2-2 of FIG. 1.
Figure 3:
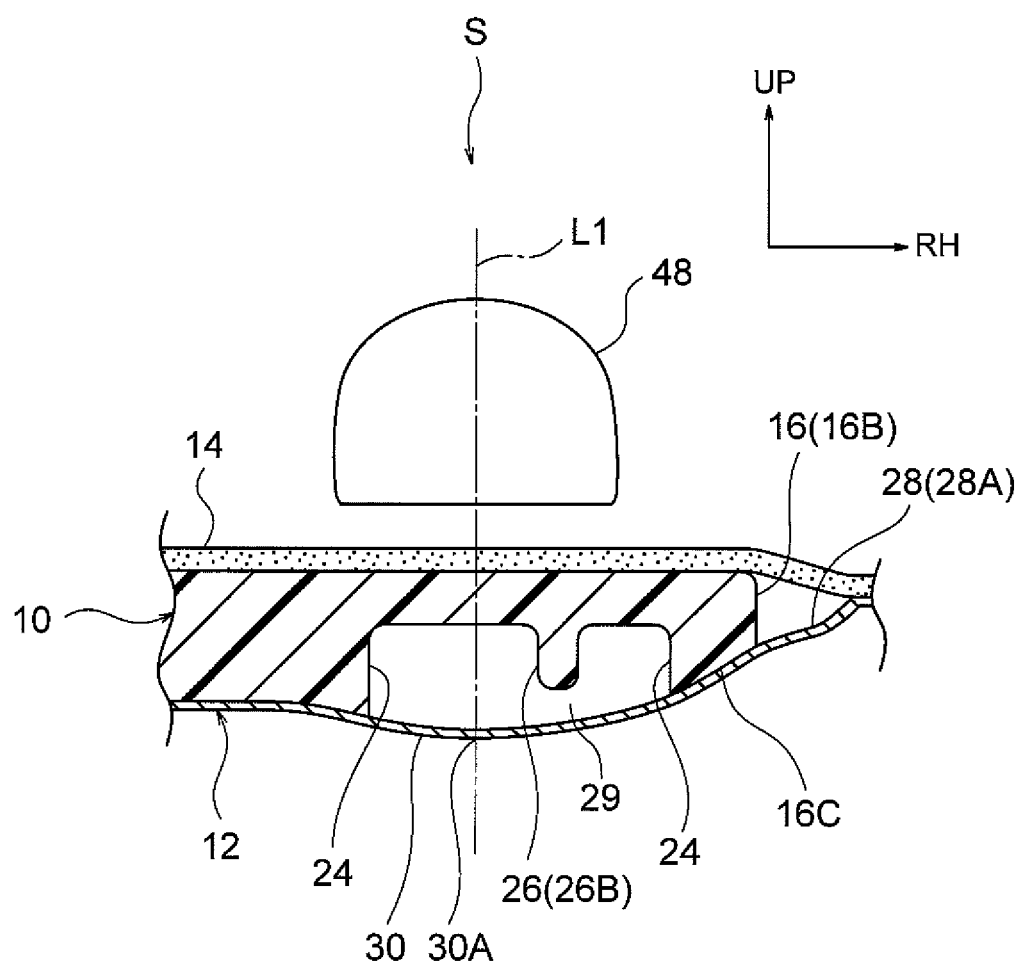
FIG. 3 is an enlarged sectional view of main portions along line 3-3 of FIG. 1.

As shown in FIG. 1 through FIG. 3, a pair of groove portions 24 are formed in a bottom surface 16C of a portion reaching from the right side horizontal portion 16A to the vehicle longitudinal direction central portion of the right side inclined portion 16B. The pair of groove portions 24 are formed so as to extend along the vehicle longitudinal direction and so as to be lined-up in the vehicle transverse direction. Further, a rib 26 that projects-out toward the vehicle lower side is formed at the right foot placement portion 16 by the region between this pair of groove portions 24.

As shown in FIG. 2 and FIG. 3, a tunnel portion 28, that is formed convexly toward the vehicle upper side, is formed at the vehicle body panel 12 at the vehicle right side with respect to the accelerator pedal 22 (see FIG. 1). An unillustrated transmission, exhaust pipe, and the like are disposed at an inner side of the tunnel portion 28. A left side portion 28A of this tunnel portion 28 is an example of the wall portion in the present invention, and is formed at an incline so as to head toward the vehicle upper side while heading toward the vehicle right side. Further, the above-described rib 26 is provided at a position offset toward the tunnel portion 28 side, i.e., the vehicle right side, with respect to a central line L1 that passes-through a central portion in the vehicle transverse direction of the accelerator pedal 22.

As shown in FIG. 6, the rib 26 is structured to have a rear side rib 26A that is formed at the right side horizontal portion 16A, and a front side rib 26B that is formed at the right side inclined portion 16B. A projecting height of the front side rib 26B is made to be smaller than a projecting height of the rear side rib 26A. Namely, given that the projecting height of the rear side rib 26A is Ha and the projecting height of the front side rib 26B is Hb, Ha>Hb along the entire length of the rib 26. A step portion 26C that is an example of the weak portion in the present invention is formed between the rear side rib 26A and the front side rib 26B. The step portion 26C is formed at a transition portion 16D that is between the right side horizontal portion 16A and the right side inclined portion 16B.

Further, the rear side rib 26A is made to abut the vehicle body panel 12. On the other hand, the front side rib 26B is set apart, toward the vehicle upper side, from the vehicle body panel 12, and has a gap 29 between the front side rib 26B and the vehicle body panel 12.

As shown in FIG. 2, a curved portion 30, that is formed convexly toward the vehicle lower side, is formed at the vehicle body panel 12 at the region positioned beneath the right side horizontal portion 16A. The curved portion 30 has a peak portion 30A on the central line L1 that passes-through the central portion in the vehicle transverse direction of the accelerator pedal 22. Further, more concretely, the above-described rear side rib 26A abuts an inclined portion 30B that is formed further toward the vehicle right side than the peak portion 30A at this curved portion 30.

Figure 4:
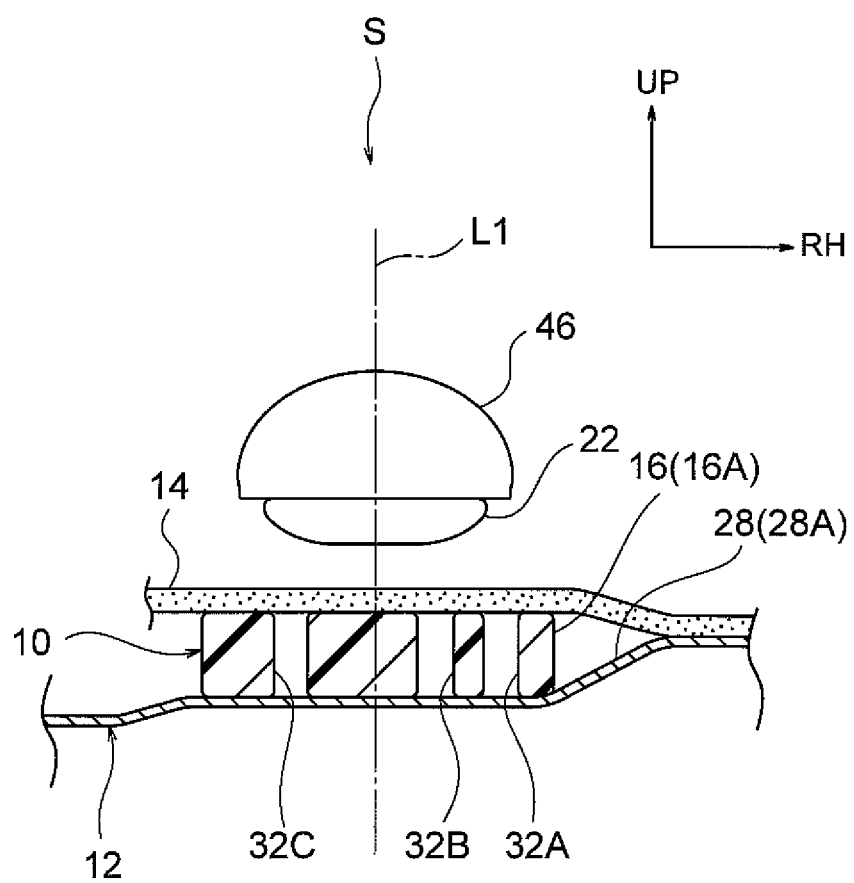
FIG. 4 is an enlarged sectional view of main portions along line 4-4 of FIG. 1.

Further, as shown in FIG. 1, plural through-holes 32A through 32C, that pass-through in the thickness direction of the right side inclined portion 16B, are formed in the right side inclined portion 16B (see FIG. 4 as well). These plural through-holes 32A through 32C are examples of the weak portions in the present invention, and are formed further toward the vehicle front side than the above-described pair of groove portions 24, and are positioned beneath a rear end portion 22A of the accelerator pedal 22 (see FIG. 6 as well).

A pair of through-holes 32A, 32B is examples of the first weak portion in the present invention, and is lined-up so as to be adjacent in the vehicle transverse direction. On the other hand, the through-hole 32C is an example of the second weak portion in the present invention, and is formed at a position that is offset toward the vehicle left side and the vehicle rear side with respect to the pair of weak portions 32A, 32B. The vehicle left side in this case is an example of the vehicle transverse direction other side in the present invention.

The left foot placement portion 18 is provided at the vehicle left side with respect to the right foot placement portion 16. The left foot placement portion 18 is a structure that is generally called a foot rest on which the left foot of the passenger is placed. A rear portion of the left foot placement portion 18 is made to be a left side horizontal portion 18A that is formed substantially horizontally. A front portion of the left foot placement portion 18, that is formed at the vehicle front side of the left side horizontal portion 18A, is made to be a left side inclined portion 18B that is inclined with respect to the vehicle longitudinal direction so as to head toward the vehicle upper side while heading toward the vehicle front side. Further, a portion between the left side horizontal portion 18A and the left side inclined portion 18B is made to be a transition portion 18C.

Figure 5:
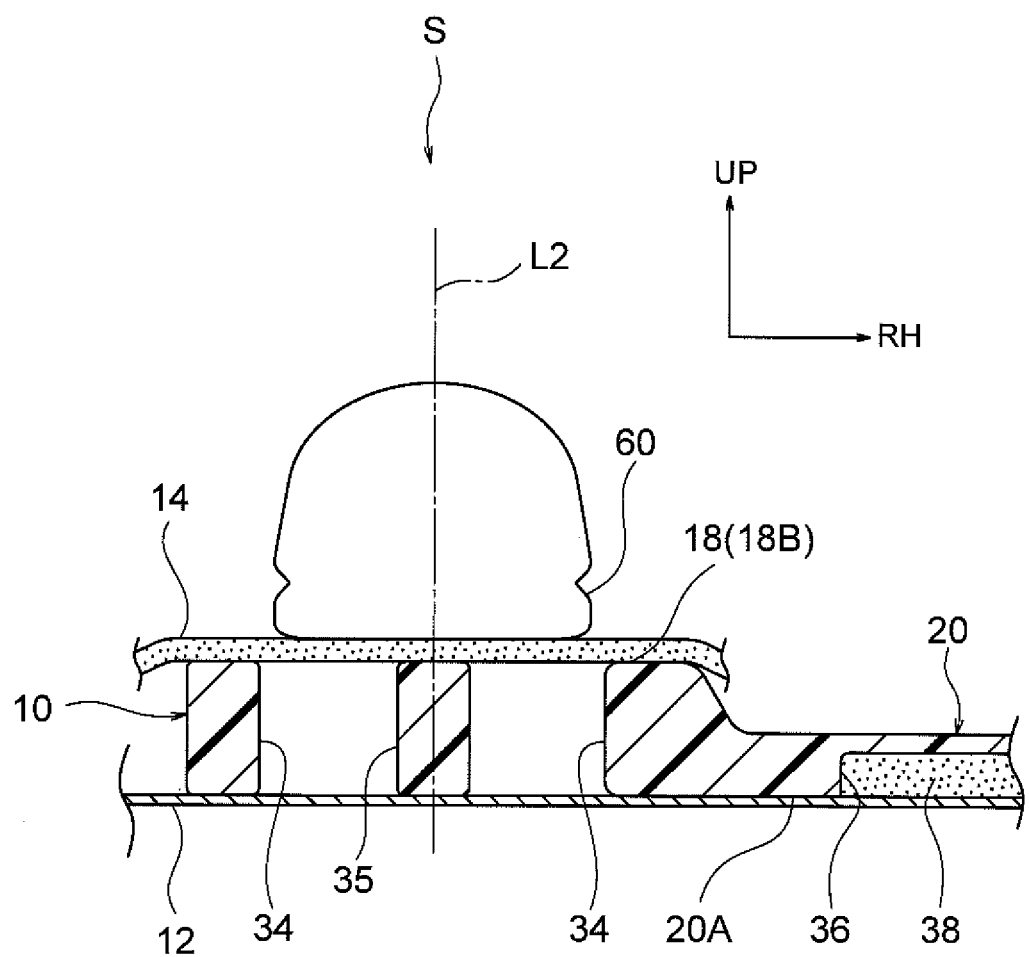
FIG. 5 is an enlarged sectional view of main portions along line 5-5 of FIG. 1.

Further, a pair of reduced-thickness portions 34, that are made to be through-holes that pass-through in the thickness direction of the left foot placement portion 18, are formed in the left foot placement portion 18. The pair of reduced-thickness portions 34 is formed in the shapes of long holes that extend in the vehicle longitudinal direction. The region between the pair of reduced-thickness portions 34 is made to be a partitioning wall portion 35. As shown in FIG. 5, the vehicle transverse direction central portion of the partitioning wall portion 35 is positioned on a central line L2 that passes-through a central portion in the vehicle transverse direction of the left foot placement portion 18.

As shown in FIG. 1, the connecting portion 20 connects the right foot placement portion 16 and the left foot placement portion 18 in the vehicle transverse direction. As shown in FIG. 5, a space portion 36, that is made to be a groove that opens at a bottom surface 20A of the connecting portion 20, is formed in the connecting portion 20, and a sound absorbing material 38, such as a felt material or the like for example, is provided in the space portion 36. This sound absorbing material 38 is structured to have density of an extent of not affecting the impact absorbing performance of the tibia pad 10.

Note that reference numerals 46 and 48 shown in FIG. 3 and FIG. 4 are toes and an instep of the right foot of the passenger, respectively. Reference numeral 60 shown in FIG. 5 is the heel of the left foot of the passenger.

The operation and effects of the embodiment of the present invention are described next.

In accordance with the embodiment of the present invention, as shown in FIG. 6, the right side horizontal portion 16A is positioned beneath and at the rear of the accelerator pedal 22, and is the portion on which the heel 50 of the right foot of the passenger, who is stepping on the accelerator pedal 22, is placed. Further, the pair of groove portions 24, that extend along the vehicle longitudinal direction and are lined-up in the vehicle transverse direction, are formed at the bottom surface 16C of the portion that reaches from the right side horizontal portion 16A to the vehicle longitudinal direction central portion of the right side inclined portion 16B (see FIG. 1 through FIG. 3 as well). Accordingly, in a case in which load is applied to the right side horizontal portion 16A by the right heel 50 of the passenger accompanying a front collision of the vehicle, impact can be absorbed by the right side horizontal portion 16A compressively deforming.

Figure 7:
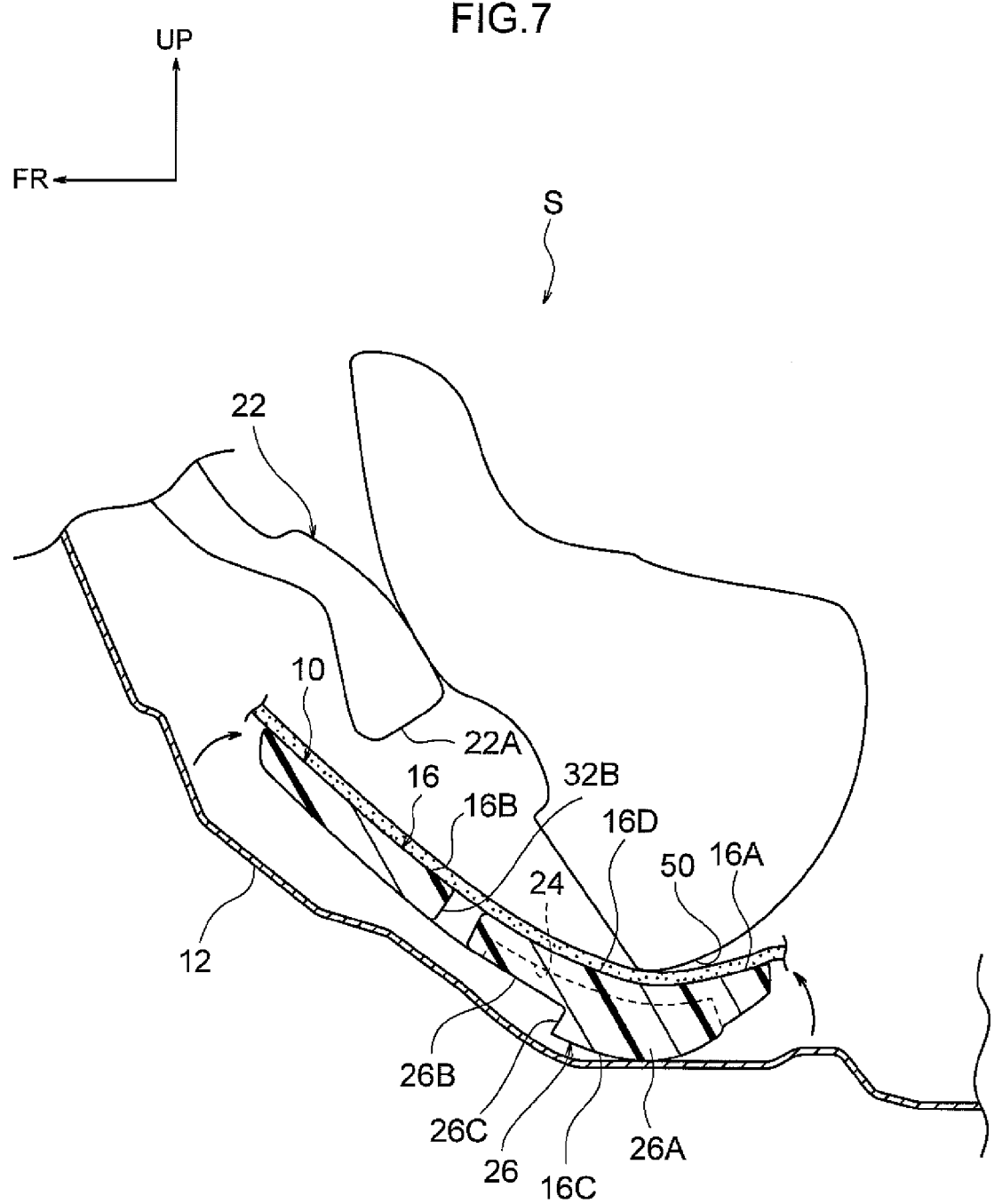
FIG. 7 is a drawing showing a state in which load is applied to a right side horizontal portion shown in FIG. 6 and a right foot placement portion is bent around an axis in a vehicle transverse direction.

Moreover, the region between the above-described pair of groove portions 24 is formed as the rib 26. The projecting height of the front side rib 26B, that is formed at the right side inclined portion 16B, of this rib 26 is made to be smaller than the projecting height of the rear side rib 26A that is formed at the right side horizontal portion 16A, and the front side rib 26B has the step portion 26C between the front side rib 26B and the rear side rib 26A. Accordingly, in a case in which load is applied to the right side horizontal portion 16A by the right heel 50 of the passenger accompanying a front collision of the vehicle, as shown in FIG. 7, the right foot placement portion 16 bends around an axis in the vehicle transverse direction, with this step portion 26C being the starting point. Due thereto, sliding of the heel 50 toward the vehicle front side can be suppressed, and therefore, from immediately after the collision, the load of the right lower leg of the passenger can be applied to the right side horizontal portion 16A that is the intended position of load application. As a result, for the right leg of the passenger, the peak value of the tibia index can be reduced more.

Further, as shown in FIG. 1, the plural through-holes 32A through 32C, that are made to be through-holes that pass-through in the thickness direction of the right side inclined portion 16B, are formed at the right side inclined portion 16B. Accordingly, as shown in FIG. 7, in a case in which load is applied to the right side horizontal portion 16A by the right heel 50 of the passenger accompanying a front collision of the vehicle, the right foot placement portion 16 bends around an axis in the vehicle transverse direction with these plural through-holes 32A through 32C (see FIG. 1) being a starting point in addition to the above-described step portion 26C. Due thereto, sliding of the heel 50 toward the vehicle front side can be suppressed even more, and therefore, from immediately after the collision, the load of the right lower leg of the passenger can be applied more effectively to the right side horizontal portion 16A that is the intended position of load application.

Figure 8:
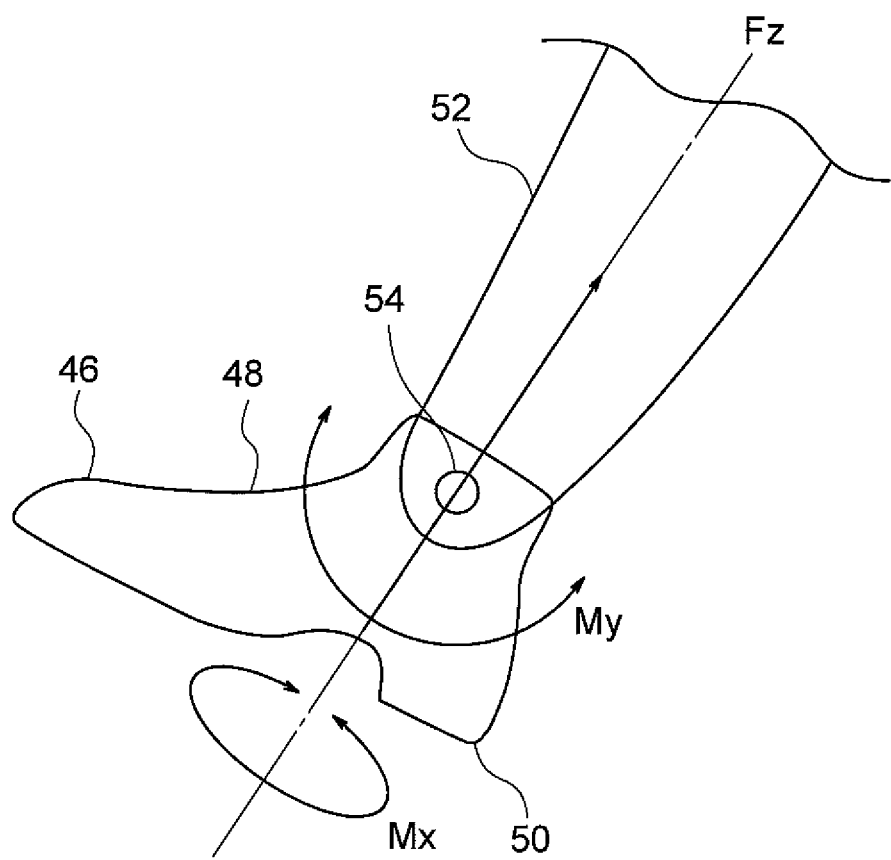
FIG. 8 is a drawing that explains axial direction load that is generated at a lower leg of a passenger, a rotational moment in a left-right direction of an ankle, and a rotational moment in a front-rear direction of a heel.

Moreover, as shown in FIG. 1, the through-hole 32C is formed at a position that is offset toward the vehicle left side and the vehicle rear side with respect to the pair of through-holes 32A, 32B. Accordingly, in a case in which load is applied to the right side horizontal portion 16A by the right heel of the passenger accompanying a front collision of the vehicle, the right foot placement portion 16 tilts toward the side at which the through-hole 32C is provided, i.e., toward the vehicle left side, and therefore, the ankle of the right leg of the passenger can be rotated toward the vehicle left side. Due thereto, as shown in FIG. 8, axial direction load Fz that is generated at a right lower leg 52 of the passenger, and rotational moment Mx in the left-right direction of an ankle 54, and rotational moment My in the front-rear direction of the heel 50 can be distributed effectively. As a result, for the right leg of the passenger, the peak value of the tibia index can be reduced more effectively.

Further, as shown in FIG. 1 through FIG. 3, the above-described rib 26 is provided at a position that is offset toward the side opposite the side at which the through-hole 32C is provided, i.e., is provided at a position that is offset toward the vehicle right side, with respect to the central line L1 that passes-through the central portion in the vehicle transverse direction of the accelerator pedal 22.

Accordingly, in a case in which load is applied to the right side horizontal portion 16A by the right heel of the passenger accompanying a front collision of the vehicle, the right foot placement portion 16 can be tilted more toward the vehicle left side. Due thereto, the ankle of the right leg of the passenger can be rotated more toward the vehicle left side. Therefore, as shown in FIG. 8, the axial direction load Fz that is generated at the right lower leg 52 of the passenger, and the rotational moment Mx in the left-right direction of the ankle 54, and the rotational moment My in the front-rear direction of the heel 50 can be distributed more effectively.

Further, as shown in FIG. 2, the curved portion 30, that is formed convexly toward the vehicle lower side and that has the peak portion 30A on the central line L1 that passes-through the central portion in the vehicle transverse direction of the accelerator pedal 22 (see FIG. 1), is formed at the vehicle body panel 12 at a region positioned beneath the right side horizontal portion 16A. Accordingly, the compressive deformation stroke of the right side horizontal portion 16A can be ensured to be large on the central line L1 that passes-through the central portion in the vehicle transverse direction of the accelerator pedal 22, and therefore, the impact absorbing performance at the right side horizontal portion 16A can be improved more. Due thereto, for the right leg of the passenger, the peak value of the tibia index can be reduced more.

Further, the rib 26 is provided at a position that is offset toward the tunnel portion 28 side with respect to the central line L1 that passes-through the central portion in the vehicle transverse direction of the accelerator pedal 22. Accordingly, in a case in which load is applied to the right side horizontal portion 16A by the right heel of the passenger accompanying a front collision of the vehicle, the ankle of the right leg of the passenger can be rotated toward the side opposite the tunnel portion 28. Due thereto, interference between the right leg of the passenger and the tunnel portion 28 can be suppressed.

Further, as shown in FIG. 5, the reduced-thickness portions 34, that are made to be through-holes that pass-through in the thickness direction of the left foot placement portion 18, are formed in the left foot placement portion 18 (see FIG. 1 as well). Accordingly, in a case in which load is applied to the left foot placement portion 18 by the left foot of the passenger accompanying a front collision of the vehicle, impact can be absorbed due to this left foot placement portion 18 compressively deforming. As a result, for the left leg of the passenger as well, the peak value of the tibia index can be reduced.

Further, as shown in FIG. 1, the space portion 36, that is made to be a groove that opens at the bottom surface 20A of the connecting portion 20, is formed at the connecting portion 20. Further, the sound absorbing material 38, such as a felt material or the like for example, is provided at this space portion 36. Accordingly, noise, such as road noise or engine sound or the like that penetrates into the vehicle cabin via the vehicle body panel 12 or the tire house or the like, can be absorbed by this sound absorbing material 38.

A modified example of the embodiment of the present invention is described next.

Figure 9:
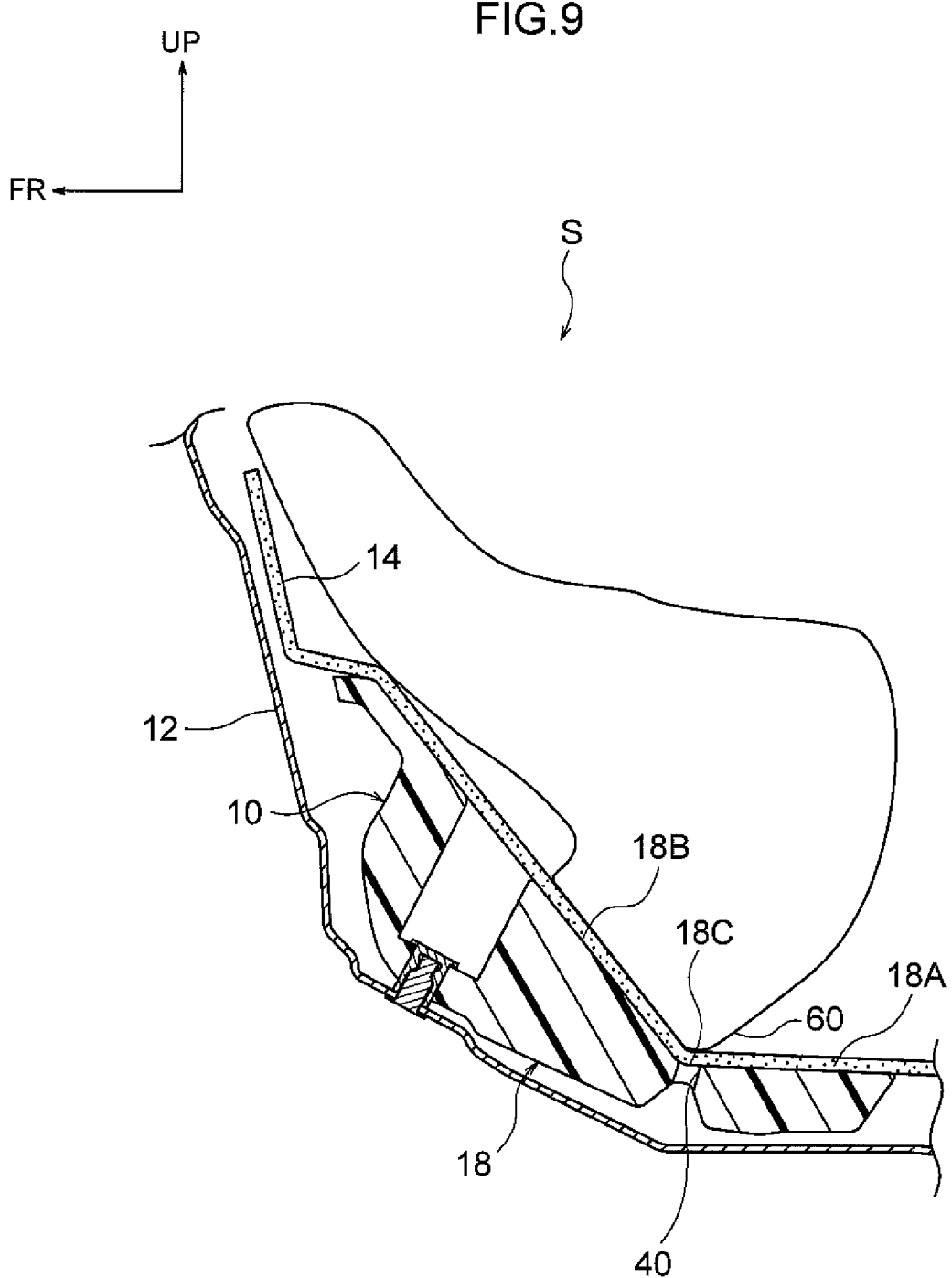
FIG. 9 is a side sectional view showing a modified example of a left foot placement portion relating to the embodiment of the present invention.

In the modified embodiment of the present invention, as shown in FIG. 9, a bending starting point portion 40, that is made to be a through-hole that passes-through in the thickness direction of the transition portion 18C between the left side horizontal portion 18A and the left side inclined portion 18B, may be formed at the transition portion 18C.

Figure 10:
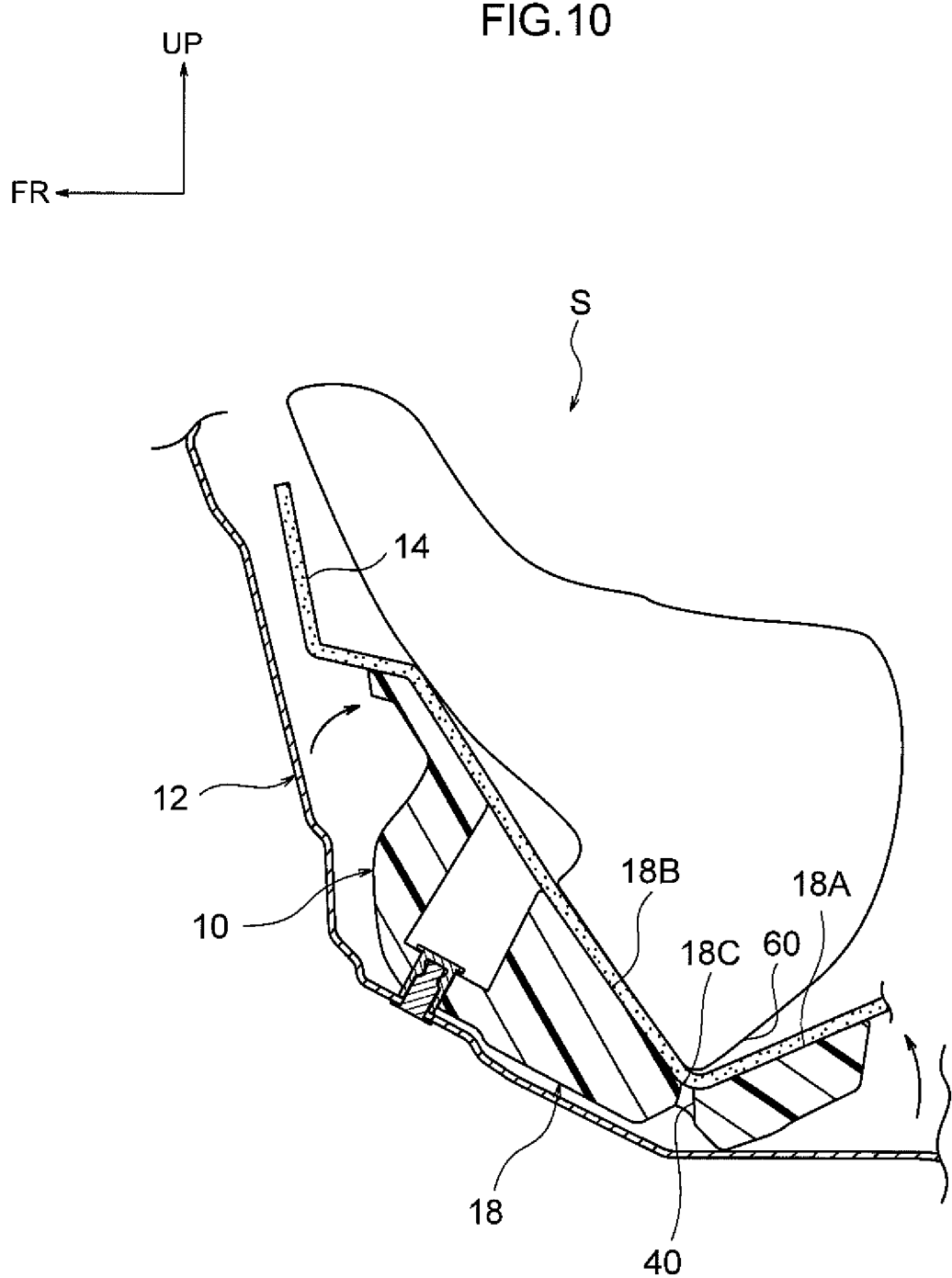
FIG. 10 is a drawing showing a state in which load is applied to a left side horizontal portion shown in FIG. 9 and the left foot placement portion is bent around an axis in the vehicle transverse direction.

When structured in this way, in a case in which load is applied to the left side horizontal portion 18A by the left heel 60 of the passenger accompanying a front collision of the vehicle, the left foot placement portion 18 bends around an axis in the vehicle transverse direction with this bending starting point portion 40 being the starting point as shown in FIG. 10. Due thereto, sliding of the heel 60 toward the vehicle front side can be suppressed, and therefore, from immediately after the collision, the load of the left lower leg of the passenger can be applied to the left side horizontal portion 18A that is the intended position of load application.

Note that, although the bending starting point portion 40 was made to be a through-hole that opens at the top surface and the bottom surface of the transition portion 18C, the bending starting point portion 40 may be made to be a groove that opens at one of the top surface and the bottom surface of the transition portion 18C. Further, in a case in which this bending starting point portion 40 is formed at the transition portion 18C, the above-described pair of reduced-thickness portions 34 may be formed as is at the left foot placement portion 18, or may be omitted.

Further, as shown in FIG. 1, the pair of groove portions 24 were formed at a portion that reaches from the right side horizontal portion 16A to the vehicle longitudinal direction central portion of the right side inclined portion 16B. However, the pair of groove portions 24 may be formed in only the right side horizontal portion 16A, or may be formed from the rear end portion to the front end portion of the right foot placement portion 16.

Further, although the rib 26 was provided at a position that is offset toward the vehicle right side with respect to the central line L1 of the accelerator pedal 22, the rib 26 may be provided at the vehicle left side as an example of the vehicle transverse direction other side. Further, in this case, the through-hole 32C may be formed at the vehicle right side and vehicle rear side, as examples of the vehicle transverse direction one side and vehicle rear side, with respect to the pair of through-holes 32A, 32B.

When structured in this way, in a case in which load is applied to the right side horizontal portion 16A by the right heel of the passenger accompanying a front collision of the vehicle, the right foot placement portion 16 tilts toward the vehicle right side, and therefore, the ankle of the right leg of the passenger can be rotated toward the vehicle right side.

Further, the plural through-holes 32A through 32C, that open at the top surface and the bottom surface of the right side inclined portion 16B, were formed in the right side inclined portion 16B as examples of the weak portion. However, grooves, that open at one of the top surface and the bottom surface of the right side inclined portion 16B, may be formed instead of these plural through-holes 32A through 32C.

Further, although the reduced-thickness portions 34 were made to be through-holes that open at the top surface and the bottom surface of the left foot placement portion 18, they may be made to be grooves that open at one of the top surface and the bottom surface of the left foot placement portion 18.

Further, although the space portion 36 was made to be a groove that opens at the bottom surface 20A of the connecting portion 20, the space portion 36 may be made to be a groove that opens at the top surface of the connecting portion 20, or may be made to be a through-hole that opens at the top surface and the bottom surface of the connecting portion 20 (a through-hole that passes-through in the thickness direction of the connecting portion 20).

Further, although the tibia pad 10 had the plural through-holes 32A through 32C and the step portion 26C as examples of the weak portion in the present invention, the tibia pad 10 may have other structures as examples of the weak portion in the present invention, provided that they are structures that become the starting point of bending around a vehicle transverse direction axis at the right foot placement portion 16.

Further, the sound absorbing material 38 was provided only at the space portion 36, but in addition thereto, may be provided at at least any of the above-described pair of groove portions 24, plural through-holes 32A through 32C, and reduced-thickness portions 34.

Further, although the tibia pad installation structure S was applied to a left-hand drive vehicle, it may be applied to a right-hand drive vehicle. In this case, the wall portion that is formed at the right side of the feet of the driver's seat corresponds to the wall portion that is directed toward the vehicle upper side in the present invention.

Further, although the tibia pad installation structure S was applied to the driver's seat side, it may be applied to the front passenger's seat side.

Further, in a case in which the tibia pad installation structure S is applied to the front passenger's seat side for example, the left foot placement portion 18 may be made to have a similar structure as the right foot placement portion 16.

Note that, among the above-described plural modified examples, modified examples that can be combined may be combined appropriately.

Although an embodiment of the present invention has been described above, the present invention is not limited to the above, and, in addition to the above, can of course be implemented by being modified in various ways within a scope that does not deviate from the gist thereof.

The invention claimed is:

1. A tibia pad comprising:
   a foot placement portion having a horizontal portion that is formed horizontally and on which a heel of a foot of a passenger is placed, and an inclined portion that is formed at a vehicle front side of the horizontal portion and is inclined with respect to a vehicle longitudinal direction so as to head toward a vehicle upper side while heading toward the vehicle front side;
   a pair of groove portions that are formed, at least in a bottom surface of the horizontal portion at the foot placement portion, so as to extend along the vehicle longitudinal direction and so as to be lined-up in a vehicle transverse direction;
   a weak portion that is formed at the inclined portion or at a transition portion between the horizontal portion and the inclined portion, and that is a starting point of bending of the foot placement portion around the vehicle transverse direction axis at the foot placement portion; and
   a rib that is formed by a region between the pair of groove portions, wherein:
   the rib has a rear side rib that is formed at the horizontal portion, and a front side rib that is formed at the inclined portion and whose projecting height is smaller than a projecting height of the rear side rib,
   the weak portion includes step portion that is formed at the transition portion and is positioned between the rear side rib and the front side rib.

2. The tibia pad of claim 1,
   wherein the foot placement portion is a right foot placement portion on which is placed a right foot of a passenger who is seated in a driver's seat, and
   the rib is provided at a position that is offset, toward a vehicle transverse direction other side, with respect to a central line that passes-through a central portion in a vehicle transverse direction of an accelerator pedal.

3. The tibia pad of claim 1, comprising:
   a left foot placement portion on which a left foot of the passenger is placed and that is provided at a vehicle left side with respect to a right foot placement portion, that serves as the foot placement portion and on which is placed a right foot of the passenger who is seated in a driver's seat,
   wherein a reduced-thickness portion, that is made to be a through-hole that passes-through in a thickness direction of the left foot placement portion or a groove that opens at one of a top surface and a bottom surface of the left foot placement portion, is formed in the left foot placement portion.

4. The tibia pad of claim 3, comprising:

a connecting portion that connects the right foot placement portion and the left foot placement portion in the vehicle transverse direction, wherein a space portion, that is made to be a through-hole that passes-through in a thickness direction of the connecting portion or a groove that opens at one of a top surface and a bottom surface of the connecting portion, is formed in the connecting portion, and a sound absorbing material is provided at least at the space portion, among the pair of groove portions, or at the reduced-thickness portion.

5. The tibia pad of claim 1, comprising:

a left foot placement portion that is provided at a vehicle left side with respect to a right foot placement portion, that serves as the foot placement portion and on which is placed a right foot of the passenger who is seated in a driver's seat, and the left foot placement portion has a left side horizontal portion that is formed horizontally and on which a heel of a left foot of the passenger is placed, and a left side inclined portion that is formed at the vehicle front side of the left side horizontal portion and that is inclined with respect to the vehicle longitudinal direction so as to head toward the vehicle upper side while heading toward the vehicle front side, wherein a bending starting point portion, that is made to be a through-hole that passes-through in a thickness direction of the transition portion between the left side horizontal portion and the left side inclined portion, or is made to be a groove that opens at one of a top surface and a bottom surface of the transition portion, is formed in the transition portion.

6. A tibia pad installation structure comprising:

the tibia pad of claim 1 that has a right foot placement portion that serves as the foot placement portion and on which is placed a right foot of a passenger who is seated in a driver's seat; and a vehicle body panel on which the tibia pad is placed and at which a curved portion, that is formed convexly toward a vehicle lower side and that has a peak portion on a central line that passes-through a central portion in a vehicle transverse direction of an accelerator pedal, is formed at a region positioned beneath the horizontal portion.

7. The tibia pad installation structure of claim 6, comprising:

a wall portion that is formed at the vehicle body panel, and is positioned at a vehicle right side with respect to the accelerator pedal, and is directed toward the vehicle upper side; and the rib that is provided at a position that is offset toward the vehicle right side with respect to the central line.

8. The tibia pad of claim 1, wherein the weak portion further includes a through-hole that passes-through in a thickness direction of the inclined portion, or a groove that opens at one of a top surface and a bottom surface of the inclined portion.

9. The tibia pad of claim 1, wherein the weak portion further includes a through-hole that passes-through in a thickness direction of the inclined portion or a groove that opens at one of a top surface and a bottom surface of the inclined portion, and the weak portion, that is formed at the inclined portion, has a first weak portion, and a second weak portion that is formed at a position that is offset toward a vehicle transverse direction one side and a vehicle rear side with respect to the first weak portion.

* * * * *